May 19, 1953 M. N. FAIRBANK 2,638,826
FILM HOLDER FOR SELF-DEVELOPING CAMERAS
Filed March 23, 1950 2 Sheets—Sheet 1

INVENTOR
Murry N. Fairbank
BY Donald L. Brown
Attorney

May 19, 1953 M. N. FAIRBANK 2,638,826
FILM HOLDER FOR SELF-DEVELOPING CAMERAS
Filed March 23, 1950 2 Sheets-Sheet 2

INVENTOR
Merry N. Fairbank
BY
Donald L. Brown
Attorney

Patented May 19, 1953

2,638,826

UNITED STATES PATENT OFFICE 2,638,826

FILM HOLDER FOR SELF-DEVELOPING CAMERAS

Murry N. Fairbank, Belmont, Mass., assignor to Polaroid Corporation, Cambridge, Mass., a corporation of Delaware Application March 23, 1950, Serial No. 151,479

17 Claims. (Cl. 95—72)

This invention relates to composite photographic film units and more particularly to composite photographic film units comprising a sheet of photosensitive material and another sheet of material adapted to be processed by spreading a liquid reagent between the said sheet materials.

This application is a continuation-in-part of my copending application Serial No. 776,329, filed September 26, 1947, for "Film Holders for Self-Developing Camera," now abandoned.

It has been proposed to process a layer of photosensitive material which has been differentially exposed to actinic light by spreading a liquid reagent between the surface of said photosensitive material and the surface of a second sheet of material whereby the liquid reagent differentially reacts with said photosensitive material.

It is one object of the present invention to provide a novel composite photographic film unit comprising a layer of photosensitive material which can be processed in the above-described manner.

It is a further object of the present invention to provide such a composite photographic film unit wherein said unit is so constructed and arranged that it can be easily and accurately positioned in the focal plane of a camera or other photographic apparatus in the presence of actinic light and the danger of accidentally exposing the photosensitive material therein is minimized.

It is a further object of the present invention to provide such a composite photographic film unit which is simple and easy to use, is compact, and which can be manufactured easily, inexpensively, and accurately.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

To practice the above-described method of processing a photographic film unit it is desirable that a certain predetermined sequence of events take place. For example, it is desirable that the sheet of photosensitive material be located in the focal plane of a camera or other photographic apparatus with no opaque material between it and the lens and shutter of the camera or the equivalent exposure means in other photographic equipment. The photosensitive material is then exposed to actinic light to form therein a latent negative image. Following the formation of a latent negative image in the photosensitive material it is then desirable to bring a second sheet of material into face-to-face relation with the photosensitive material. Next, it is desirable to spread a predetermined quantity of a liquid reagent between the interface surfaces of the photosensitive material and the second sheet of material in a substantially uniform layer as, for example, by drawing the two sheets of material with said liquid located adjacent the leading edge of the latent image through pressure-applying means as, for example, a pair of rollers or a pair of barlike member spaced apart a predetermined distance.

The present invention comprises an envelope opaque to actinic light which removably carries a sheet of photosensitive material and a second sheet of material together with a predetermined quantity of liquid reagent. The envelope has a removable closure thereon which prevents actinic light from entering said envelope to fog the photosensitive material and which is adapted to release said envelope when it is desired to pull the envelope from around said photosensitive material when the composite film unit is positioned in a camera or other photographic apparatus to make possible the exposure of said photosensitive material to form therein a latent negative image.

Figure 1:
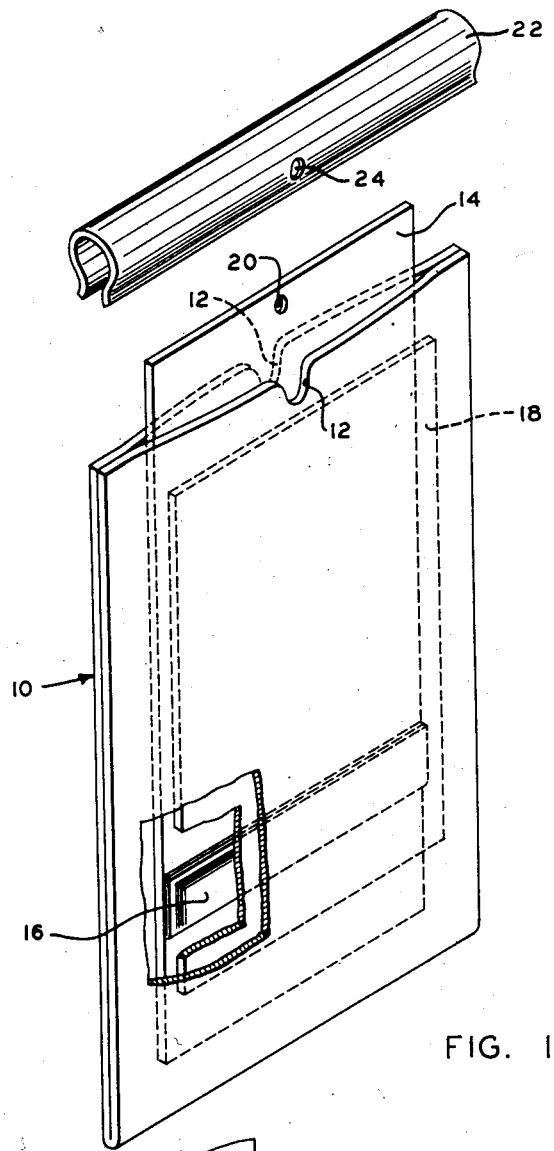
Figure 1 is an exploded perspective view of a preferred embodiment of the composite photographic film unit of the present invention.
Figure 2:
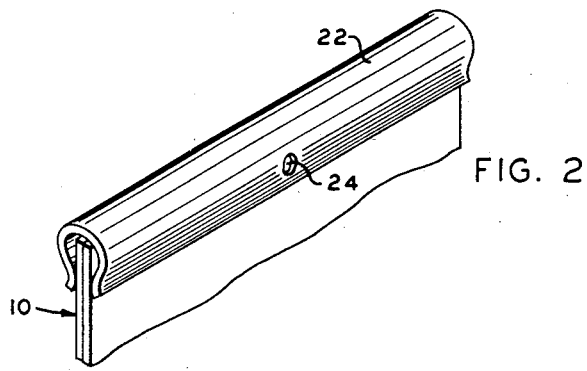
Fig. 2 is a fragmentary perspective view of the closure on the composite photographic film unit of the present invention.

A preferred embodiment of the present invention is illustrated in Figs. 1 and 2 of the drawings wherein there is shown an envelope 10 preferably made from a material which is opaque to light which is actinic to the photosensitive material contained therein as, for example, a black tab stock. The envelope 10 is formed by folding a strip of said tab stock, having a width equal to the desired width of the envelope 10 and twice the length of said envelope 10, substantially along its transverse center line to form two walls. The two walls are sealed together with a suitable adhesive along the two edges thereof extending from the fold. Both folds of the tab stock along the edges thereof forming the open end of the envelope 10 are provided with aligned notches 12 at substantially the center of said open end.

A sheet of photosensitive material 14 which may comprise a layer of any photosensitive material as, for example, silver halide, is carried by a layer of any suitable material, as for example, paper, cellulose acetate, or cellulose nitrate. The sheet of photosensitive material 14 preferably has a width slightly less than the width of the inside of the envelope 10 so that it can slide freely in and out of said envelope 10 and a length sufficient to extend across the length of the exposure aperture of the camera, or other photographic apparatus, in which it is to be exposed and to extend out of said camera or said other apparatus a sufficient distance to permit its being grasped and drawn therefrom.

A liquid-carrying container 16, carrying a supply of liquid reagent, is located on and adhesively carried by the sheet of photosensitive material 14. The liquid-carrying container 16 is positioned on the photosensitive material 14 parallel and adjacent to the edge of, but outside of, a predetermined area on said photosensitive material which is adapted to be positioned behind the exposure aperture and in the focal plane of the camera or other photographic apparatus. Preferably, the liquid-carrying container 16 is an envelope or saclike structure formed by folding a multilayer sheet of material upon itself and sealing the three edges thereof to form a liquid-carrying container which is impervious to the contained liquid and which is also impervious to oxygen and water vapor. The liquid-carrying container 16 thus formed is adapted, upon the application of a mechanical stress thereto, to break open along its longitudinal sealed edge and release its contained liquid. The multilayer sheet from which the liquid-carrying container 16 is formed preferably comprises a base layer of craft paper or fabric, an intermediate layer of metal foil such as a sheet of lead foil laminated to the base layer, and a third layer of heat-sealing plastic substantially impervious and inert to the liquid to be enclosed.

A second sheet of material 18 is carried by the envelope 10 and is preferably removably attached to the inner surface of one of the walls of said envelope 10 in such a position that one of its surfaces is in face-to-face relation with the photosensitive layer of the sheetlike material 14. The sheet of material 18 may comprise any flexible material as, for example, paper, cloth, thin wood, metal, plastic, or the material known to the art as baryta paper.

A perforation 20 is provided in one edge of the sheet of photosensitive material 14 in alignment with the notches 12. A closure strip 22, substantially U-shaped in cross section, having aligned perforations 24 formed therein at substantially its mid-point, fits over the open end of the envelope 10 and is releasably held thereon by being lightly crimped, or bent together, so that it may be readily pulled from said envelope to open the same. When the closure strip 22 is on the envelope 10 and sealing the same, as is illustrated in Fig. 2, the aligned perforations 24 therein are in alignment with the perforation 20 and the notches 12.

In one satisfactory form of the invention the total thickness of the layer of photosensitive material and its supporting base layer is substantially .0065 inch, the thickness of the second sheet of material 18 is substantially .0065 inch, and the thickness of the black tab stock employed to form the envelope 10 is substantially .003 inch.

If the photosensitive material 14 comprises a diazonium photosensitive material the liquid carried by the liquid-carrying container 16 can be such that it will develop a visible positive image in said material 14. If the photosensitive material 14 comprises a standard silver halide photosensitive material the liquid reagent may develop a negative image therein and it may also fix the negative image. In a preferred form of the invention the liquid also creates a positive image of the latent negative image on the surface of a second sheet of material. If such a positive image is desired a liquid composition is preferably formed as set forth in the following non-limiting example:

*Example*

| | Grams |
|---|---|
| Water | 1860 |
| Sodium carboxymethyl cellulose | 93 |
| Sodium sulfite | 78 |
| Sodium hydroxide | 74.6 |
| Sodium thiosulfate | 14.5 |
| Citric acid | 38.5 |
| Hydroquinone | 52.0 |

The second sheet of material 18 may be scored or perforated to outline the area thereon which will receive the positive image when the composite photographic film unit is processed. Such scoring or perforating permits the finished print to be removed from the envelope and also permits the marginal edges of said sheet 18 to be permanently attached to the wall of the envelope 10.

Although it is preferred to use a second sheet of material 18 in the envelope 10 to receive the image-forming complexes, the present invention also includes employing the inner surface of one of the walls of envelope 10 to receive said image-forming complexes. When this is done the liquid reagent contained by the liquid-carrying container 16 may be such that its reaction with the layer of photosensitive material 14 will form white image-forming complexes, or as an alternative the inner surface of one wall can be coated with a white pigment to produce a suitable white background for the image-forming components.

Figure 4:
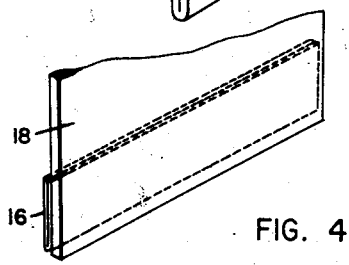
Fig. 4 is a fragmentary perspective view of a modification of one of the elements of the structure in Fig. 1.

It is preferred that the liquid-carrying container 16 be attached to the layer of photosensitive material 14. However, it will be appreciated that the container 16 may be attached to the second sheet of material 18, as shown in Fig. 4, or to the inner surface of a wall of the envelope 10. When the liquid-carrying container 16 is attached to the sheet 18 or a wall of the envelope 10, it will be so located thereon that it will be adjacent to the lower edge of the image-receiving area on the sheet of photosensitive material 14 when said material 14 is in position in the envelope 10.

Figure 3:
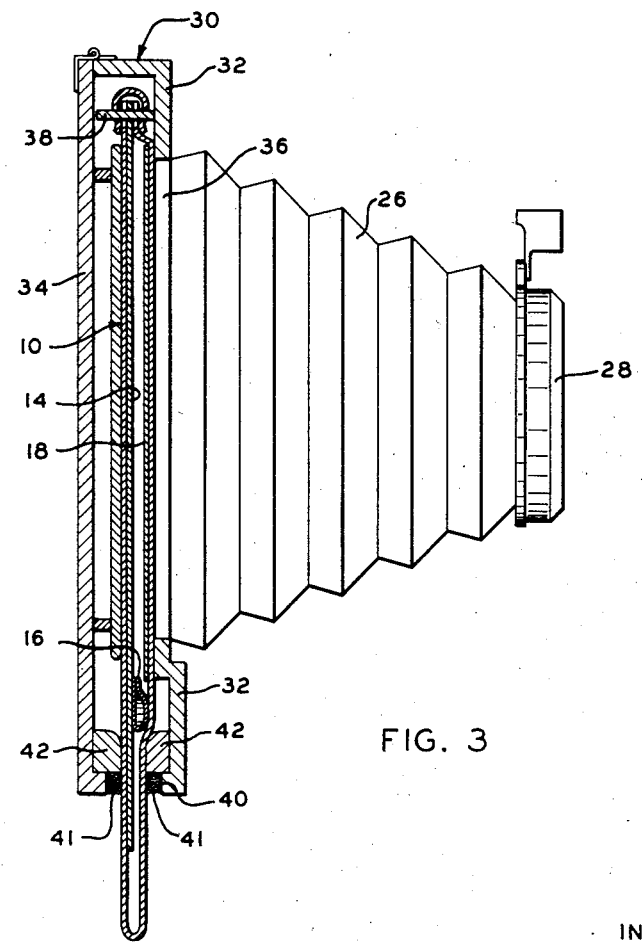
Fig. 3 is a view illustrating diagrammatically one form of apparatus in which the composite photographic film unit of the present invention may be exposed and processed.

Fig. 3 illustrates diagrammatically one form of apparatus in which the novel composite film unit of the present invention may be used. The apparatus of Fig. 3 comprises a camera having a conventional bellows 26 and lens and shutter assembly 28 which are attached to a camera back 30 comprising a housing 32 and a cover 34 hingedly mounted thereon. The housing 32 has an exposure aperture 36 formed therein and a pin 38 rigidly mounted on its inner surface adjacent the upper edge of said exposure aperture 36 and extending rearwardly thereof toward the cover 34. A slot 40 having a light seal 41 therein is provided in the bottom of the camera back 30 between the housing 32 and the cover 34. A pair of spaced pressure-applying members 42 are located inside of the camera back 30 adjacent to and on each side of the slot 40. The pressure-applying members 42 disclosed in Fig. 3 comprise a pair of rigid bars that are held a predetermined distance apart against movement toward or away from each other when the camera back 30 is in the operative position disclosed in Fig. 3. However, the pressure-applying means may comprise a pair of rollers similarly mounted against movement toward or away from each other, or a pair of bars or rollers that are urged toward each other by means of spring loading.

To load the novel composite film unit of the present invention in the apparatus disclosed in Fig. 3 the cover 34 is opened and one of the composite film units is placed in the housing 32 by inserting the pin 38 through the aligned perforations 24 in the closure strip 22 and the perforation 20 in the sheet of photosensitive material 14. The cover 34 is then closed. The major portion of the composite film unit is then located in the camera back 30 with a length of the envelope 10 and a shorter length of the photosensitive sheet 14 therein extending out of said camera back 30 through the pressure-applying members 42 and the slot 40.

To expose the photosensitive material 14 and process the latent negative image formed to form a visible positive image of said latent negative image on the sheet 18 the lower end of the envelope 10 is grasped, taking care not to engage the end of the sheet of photosensitive material 14, and the envelope is pulled downwardly to pull it out of the closure strip 22 and out of the camera a sufficient distance to uncover the area of the photosensitive material 14 which is in back of the exposure aperture 36. The photosensitive material 14 is then exposed to actinic light by actuating the shutter 28 and the envelope 10 is pushed back into the camera back 30 and over the photosensitive material 14 to substantially the same position illustrated in Fig. 3. Following this, the lower end of the envelope 10 is again grasped but this time taking care to grasp it high enough to also engage the lower end of the sheet of photosensitive material 14, and the envelope and said sheet 14 are pulled downwardly to cause said sheet 14 to tear away from the pin 38. After the photosensitive material 14 is torn free of the pin 38 the entire assemblage less the closure strip 22 which remains on the pin 38 is drawn from the camera between the pressure-applying means 42. The distance between pressure-applying members 42 exceeds the total thickness of the envelope 10, the photosensitive material 14 and the sheet material 18 by a distance at least equal to two thicknesses of the multilayer sheet material from which the liquid-carrying container 16 is formed. The exact difference between said width and thickness depends upon the thickness of the layer of liquid to be spread and the configuration of the members 42. However, the distance between the members 42 is substantially less than the thickness of the composite film unit at the point where the liquid-carrying container 16 is located. Therefore, the act of drawing the composite photographic film unit through the pressure-applying means 42 causes said pressure-applying means 42 to exert a pressure on the liquid-carrying container 16, which pressure, in turn, causes said container 16 to rupture and discharge its contained liquid between the interface surfaces of the photosensitive layer 14 and the layer of material 18. Continued movement of the composite film unit through the pressure-applying means 42 causes them to spread the released liquid between said interface surfaces in a layer of uniform predetermined thickness to cause the above-mentioned reactions to take place. After a sufficient length of time has elapsed after the composite film unit is drawn through the pressure-applying means 42 for the desired reaction to take place envelope 10 is torn apart and the layer of material 18 is peeled from the layer of photosensitive material 14 to give on the layer 18 a visible positive image of the latent negative image which was formed in the layer 14.

Whereas the use of the novel composite photographic film unit of the present invention has been disclosed in connection with a specific form of camera adapted to process said film unit as it is being withdrawn therefrom, it will be understood that the novel composite photographic film unit may be removed from the photographic apparatus and processed at some remote time or place by being passed through a pressure-applying means.

In the products hereinabove described there is provided in container 16 a liquid capable of processing photosensitive layer 14. In the preferred form of the products, photosensitive layer 14 is a silver halide emulsion or the like and the liquid released from container 16 cooperates with the emulsion and with the image-receiving layer 18 to carry out a transfer process. This transfer process in one preferred form involves the development of a latent image in the emulsion and the removal from that emulsion of part at least of undeveloped silver halide as a soluble complex, which soluble complex is transported from the photosensitive layer to form the positive print. However, it will now be apparent that by so forming the products as to omit therefrom the substance for forming the soluble complex it becomes possible to only develop the silver halide emulsion. It is believed to be also evident now that developable photosensitive materials other than silver halides may constitute the photosensitive layer 18 which is processed and that the product may carry suitable developing agents and such other liquid as is necessary to render said agents operative to effect the development of the photosensitive layer.

Certain diazonium compounds are destroyed by light and photographic processes involving such compounds as their photographic materials have been used commercially. There are several known ways in which a diazonium salt layer may be exposed and developed to produce a relatively stable image. In each of these processes the treatment of the photosensitive diazonium layer may be accomplished by applying thereto a liquid containing certain developing reagents. (L. P. Clerc, "Photography Theory and Practice," second edition, published 1937 by Pitman Publishing Company, page 444, paragraph 693.)

The products of the present invention may be used in conjunction with or may comprise as elements thereof diazonium photosensitive layers. For example, in the product of Fig. 1 the photosensitive layer 14 may have as its photosensitive substance a diazonium compound such as that sold by the Boston Blue Print Company under the name "Blackline #202," and the liquid reagent in the container 16 then preferably comprises a mixture of sodium carboxymethyl cellulose, water and "Blackline" developer #203½ (sold by Boston Blue Print Company and manufactured by Frederick Post Company, Chicago). In the alternative, the photosensitive layer 18 may be obtained by applying to one side of a suitable sheet material a sensitizing solution which consists of 20 grams of chlorostannate of para-diazo-di-N-butyl-aniline, 0.4 gram of Pontacyl Brilliant Blue 2R, and 1 liter of water. The liquid-developing reagent in the container 16 then preferably comprises, by weight, 4 parts of medium viscosity sodium carboxymethyl cellulose, 100 parts of water, 5.8 parts of sodium carbonate (monohydrate) and 2.3 parts of phloroglucinol.

It is also well known that certain ferric salts of organic acids, for example the oxalates, tartrates, and citrates, are reduced to ferrous salts when exposed to light. (L. P. Clerc, "Photography Theory and Practice," second edition, published 1937 by Pitman Publishing Company, page 402, paragraph 621 et seq.; Crowley Patents Nos. 2,093,421, 2,113,423, 2,130,070, 2,130,071, 2,137,015.) A considerable number of photographic processes depend for their functioning on these photochemical phenomena. It is known in connection with these iron salts that any reagent that will differentiate between ferric and ferrous salts can be used to develop the barely visible image formed by the photochemical reduction of the ferric salt into an image which is very easily visible. Examples of such developing reagents are potassium ferricyanide, potassium ferrocyanide, tannins, gallic acid, B-naphthoquinone-sulphonic acid, silver salts, platinum and palladium salts. It is believed to be now apparent to one skilled in the art that the photo-responsive ferrous salts may constitute the photosensitive material of the photosensitive layer 18, and the liquid in the container 16 may include or dissolve in its travel to the photosensitive layer any one of the aforementioned developing reagents for distinguishing between the ferric and ferrous salts and producing the easily visible image from the very light image that is originally obtained by the photoexposure of the iron salts.

Broadly, the products of the present invention may comprise, or may be used with, any photographic, photosensitive material for the purpose of developing the same. It is to be understood that the invention is not limited to materials sensitive to visible radiation but includes photographic, photosensitive materials sensitive to such other radiation as X-ray, ultraviolet or infrared. Exposure of the photosensitive layer may be suitably accomplished by means of X-ray or gamma radiation. The resulting product is thus particularly suitable for use in the taking of X-ray pictures and may also be used for detecting and for giving, when processed, a visible indication of the extent of the presence of nuclear radiation, i. e., of radiation such as is associated with X-ray, radium, uranium and other natural or artificial radioactive materials, and particularly gamma radiation, beta radiation and neutron radiation.

The term "photographic developing reagent" as used herein is intended to include any reagent which acts to render a visible image more visible, as in the case of the ferric salts, or an invisible image visible, as in the case of the silver halide emulsions. The term "development" is intended to cover the treatment of any photographic, photosensitive material for the purpose of rendering an image formed therein by photoexposure visible or more visible. The photoexposure may, of course, be the result of exposure to any type of radiation actinic to the photosensitive material.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A composite photographic film unit comprising a sheet of photosensitive material, means so encasing said sheet as to prevent exposure thereof by visible light actinic thereto, and a liquid-carrying container positioned within said encasing means and so located relative to said sheet as to be capable of releasing its contents for distribution over the surface of said sheet to process a predetermined area thereof, said encasing means comprising an envelope opaque to light which is actinic to said photosensitive material and within which said sheet is slidably mounted, said envelope having an open end through which said sheet is removable from said envelope, said envelope having a notch adjacent the open end thereof which leaves uncovered a portion of said sheet, said notch coacting with said uncovered portion to permit said sheet to be withdrawn from said envelope without rupture of the envelope walls by a force applied to said portion from the exterior of said envelope.

2. A composite photographic film unit comprising a sheet of photosensitive material, means so encasing said sheet as to prevent exposure thereof by visible light actinic thereto, and a liquid-carrying container positioned within said encasing means and in direct contact with said sheet so as to be capable of releasing its contents for distribution over the surface of said sheet to process a predetermined area thereof, said encasing means comprising an envelope opaque to light actinic to said photosensitive material and within which said sheet is slidably mounted and a removable closure member closing one end of said envelope, said sheet being removable from said envelope through said end when said closure member is removed from said envelope.

3. A composite photographic film unit comprising a sheet of photosensitive material, means so encasing said sheet as to prevent exposure thereof by light actinic thereto, and a liquid-carrying container positioned within said encasing means and in direct contact with said sheet so as to be capable of releasing its contents for distribution over the surface of said sheet to process a predetermined area thereof, said encasing means comprising an envelope opaque to light which is actinic to said photosensitive material and in which said sheet is slidably mounted, said envelope having an open end through which said sheet may be slidably removed from said envelope.

4. A composite photographic film unit comprising an envelope closed along three edges and open along a fourth edge, a sheet of photosensitive material in said envelope and slidably movable with respect thereto, said envelope being opaque to light which is actinic to said photosensitive material, said open edge of said envelope having a notch therein, a predetermined area on said photosensitive material being uncovered by said notch, said uncovered area having a perforation therein, a second sheet of material in said envelope in face-to-face relation with said photosensitive material, said second sheet of material being carried by the inner surface of one side of said envelope, a liquid-carrying container mounted within said envelope in position to discharge its contained liquid for spreading between said two sheets, and a removable closure member closing said open edge.

5. A composite photographic film unit comprising an envelope having a front wall and a back wall, said front and back walls being joined together along three edges thereof, a sheet of photosensitive material in said envelope and slidably movable with respect thereto, said walls being opaque to light which is actinic to said photosensitive material, said photosensitive material having a predetermined area thereon adapted to have a latent image formed therein, a second sheet of material in said envelope in face-to-face relation with said image area and carried by the inner surface of one of said walls, and a liquid-carrying container mounted between the interface surfaces of said photosensitive material and said sheet of material, said liquid-carrying container being located outside of but adjacent to said image area.

6. A composite photographic film unit comprising an envelope, a sheet of photosensitive material in said envelope and slidably movable with respect thereto, said envelope comprising a sheet of material folded transversely thereof to form two walls joined by a folded edge, said walls being sealed together along two edges extending from said folded edge to give an envelope closed along three edges and open along a fourth, said sheet of material being opaque to light which is actinic to said photosensitive material, said open edge having a notch therein uncovering a predetermined area of said photosensitive material, said uncovered area having a perforation therein, said photosensitive material having a predetermined area thereon adapted to have a latent image formed therein, a second sheet of material in said envelope in face-to-face relation with said photosensitive material and carried by the inner surface of one of said walls, a liquid-carrying container mounted between the interface surfaces of said photosensitive material and said second sheet of material, said liquid-carrying container being located outside of but adjacent to said image area, and a removable closure strip closing said open edge and covering said notch, said closure strip having a pair of opposed perforations therein in alignment with the perforation in said uncovered area of said photosensitive material.

7. A composite photographic film unit comprising an envelope having a front wall and a back wall, said front and back walls being joined together along three edges thereof, a sheet of photosensitive material in said envelope and slidably movable with respect thereto, said walls being opaque to light which is actinic to said photosensitive material, said photosensitive material having a predetermined area thereon adapted to have a latent image formed therein, a second sheet of material in said envelope in face-to-face relation with said image area and carried by the inner surface of one of said walls, and a liquid-carrying container mounted on said photosensitive material between the interface surfaces of said photosensitive material and said second sheet of material, said liquid-carrying container being located outside of but adjacent to said image area.

8. A composite photographic film unit comprising an envelope, a sheet of photosensitive material in said envelope and slidably movable with respect thereto, said envelope comprising a sheet of material folded transversely thereof to form two walls joined by a folded edge, said walls being sealed together along two edges extending from said folded edge to give an envelope closed along three edges and open along a fourth, said sheet of material being opaque to light which is actinic to said photosensitive material, said open edge having a notch therein uncovering a predetermined area of said photosensitive material, said uncovered area having a perforation therein, said photosensitive material having a predetermined area thereon adapted to have a latent image formed therein, a second sheet of material in said envelope in face-to-face relation with said photosensitive material and carried by the inner surface of one of said walls, a liquid-carrying container mounted on said photosensitive layer between the interface surfaces of said photosensitive material and said second sheet of material, said liquid-carrying container being located outside of but adjacent to said image area, and a removable closure strip closing said open edge and covering said notch, said closure strip having a pair of opposed perforations therein in alignment with the perforation in said uncovered area of said photosensitive material.

9. A composite photographic film unit comprising an envelope having a front wall and a back wall, said front and back walls being joined together along three edges thereof, a sheet of photosensitive material in said envelope and slidably movable with respect thereto, said walls being opaque to light which is actinic to said photosensitive material, said photosensitive material having a predetermined area thereon adapted to have a latent image formed therein, a second sheet of material in said envelope in face-to-face relation with said image area and carried by the inner surface of one of said walls, and a liquid-carrying container mounted on said second sheet of material between the interface surfaces of said photosensitive material and said second sheet of material, said liquid-carrying container being located outside of but adjacent to said image area.

10. A composite photographic film unit comprising an envelope having a front wall and a back wall, said front and back walls being joined together to provide light seals along three edges thereof, a substantially light-tight closure for the fourth edge, a sheet in said envelope and slidably movable with respect thereto, said sheet including a photosensitive material, said walls being opaque to light which is actinic to said photosensitive material, said photosensitive material having a predetermined area thereon adapted to have a latent image formed therein, and a liquid-carrying container mounted in said envelope in direct contact with said sheet of photosensitive material and in position to discharge its contained liquid for spreading between said photosensitive material and the adjacent internal surface of one of said envelope walls, a portion of said envelope at the end thereof farthest from said closure extending beyond the end of a corresponding portion of said sheet whereby said envelope walls can be grasped and squeezed together to permit pulling of said envelope from said sheet while said sheet is held stationary.

11. A composite photographic film unit comprising an envelope having a front wall and a back wall, said front and back walls being joined together to provide light seals along three edges thereof, a light-tight closure for the fourth edge, a sheet in said envelope and slidably movable with respect thereto, said sheet including a photosensitive material, said walls being opaque to light which is actinic to said photosensitive material, said photosensitive material having a predetermined area thereon adapted to have a latent image formed therein, and a liquid-carrying container mounted in said envelope in direct contact with said sheet of photosensitive material and in position to discharge its contained liquid for spreading between said photosensitive material and the adjacent internal surface of one of said envelope walls, a portion of said envelope at the end thereof farthest from said closure being arranged to be grasped to permit pulling of said envelope from said sheet while said sheet is held stationary.

12. A photosensitive film assembly comprising a first liquid-confining layer, a second liquid-confining layer, said liquid-confining layers being superposed, a container holding a liquid composition and located between and in contact with said liquid-confining layers for discharge of its liquid content for spreading between and in contact with said layers, said first liquid-confining layer constituting a photographic element having a photosensitive portion on the inner surface thereof which overlies the inner surface of the second liquid-confining layer, said photosensitive portion being capable of having an image formed therein upon exposure, said film assembly containing processing material and including a photographic reagent in an amount sufficient to process an image formed in said assembly, said liquid composition, upon rupture of said container, rendering said processing material effective to process said image, an envelope, formed of a material which is substantially opaque to visible and near visible light, encasing at least the photosensitive portion of said first liquid-confining layer, and means for securing said envelope in surrounding and encasing relation to said first liquid-confining layer, said last-mentioned means being readily disconnected from said film assembly whereby said envelope is withdrawable from said photosensitive portion.

13. The photosensitive film assembly of claim 12 wherein the second liquid-confining layer is a wall of the envelope.

14. The photosensitive film assembly of claim 12 wherein the second liquid-confining layer is secured to the inner surface of one of the walls of the envelope.

15. A composite photographic film unit comprising a first, light-opaque, liquid-confining wall member, a second, light-opaque, liquid-confining wall member, said wall members being secured together adjacent their edges to provide a lighttight envelope, a photosensitive element contained within said envelope and protected thereby against exposure to visible radiation, containing means within said envelope and a processing liquid held in said containing means so as to be out of contact with said photosensitive element, said containing means having a rupturable sealed passage adjacent said photosensitive element through which the liquid content of said containing means can be discharged by squeezing together the wall members opposite the contained liquid, said liquid being releasable between the liquid-confining wall members into that portion of the envelope interior which contains the photosensitive element, said photosensitive element being loosely held between the liquid-confining wall members so that it can be freely removed from said envelope when an opening is provided therein, one of said liquid-confining wall members having a layer affixed thereto and constituting at least a portion of the internal surface thereof, said layer being directly in contact with said containing means and with said photosensitive element and providing a continuous path for flow of liquid from said containing means to the photosensitive portion of said element.

16. A composite photographic film unit comprising a first, light-opaque, liquid-confining wall member, a second, light-opaque, liquid-confining wall member, said wall members being secured together adjacent their edges to provide a lighttight envelope, a photosensitive element contained within said envelope and protected thereby against exposure to visible radiation, containing means within said envelope and a processing liquid held in said containing means so as to be out of contact with said photosensitive element, said containing means having a rupturable sealed passage adjacent said photosensitive element through which the liquid content of said containing means can be discharged by squeezing together the wall members opposite the contained liquid, said liquid being releasable betweeen the liquid-confining wall members into that portion of the envelope interior which contains the photosensitive element, said photosensitive element being loosely held between the liquid-confining wall members so that it can be freely removed from said envelope when an opening is provided therein, said envelope comprising means detachably secured thereto adjacent the portion thereof containing said photosensitive element and capable upon detachment of providing an opening in said envelope through which said photosensitive element may be withdrawn from said envelope, one of said liquid-confining wall members having a layer affixed thereto and constituting at least a portion of the internal surface thereof, said layer being directly in contact with said containing means and with said photosensitive element and providing a continuous path for flow of liquid from said containing means to the photosensitive portion of said element.

17. A composite photographic film unit comprising a lighttight envelope which includes a pair of liquid-confining opposed walls, a photosensitive element contained in said envelope between said walls, a processing liquid contained within said envelope and containing means for holding said processing liquid in said envelope out of contact with said photosensitive element, said containing means including a rupturable seal adjacent said photosensitive element which can be ruptured by the application of pressure to the exterior of said envelope to release its content within said envelope in the direction of the photosensitive element, said photosensitive element comprising a silver halide emulsion and said processing liquid comprising a silver halide developer, and means detachably secured to said envelope and capable upon detachment of providing an opening in said envelope through which said photosensitive element may be withdrawn from said envelope, one of said liquid-confining walls having a layer affixed thereto and constituting at least a portion of the internal surface thereof, said layer being directly in contact with said containing means and with said photosensitive element and providing a continuous path for flow of liquid from said containing means to the photosensitive portion of said element.

MURRY N. FAIRBANK.

References Cited in the file of this patent

UNITED STATES PATENTS

| Number | Name | Date |
|---|---|---|
| 539,557 | Stubel | May 21, 1895 |

FOREIGN PATENTS

| Number | Country | Date |
|---|---|---|
| 108,679 | Great Britain | July 11, 1918 |